United States Patent
Han et al.

(10) Patent No.: US 8,733,086 B2
(45) Date of Patent: May 27, 2014

(54) TAIL TRIM ASSEMBLY FOR EXHAUST PIPE IN VEHICLE

(75) Inventors: Hak Son Han, Seongnam-si (KR); Je Hui Jun, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 278 days.

(21) Appl. No.: 12/947,560

(22) Filed: Nov. 16, 2010

(65) Prior Publication Data

US 2012/0073275 A1  Mar. 29, 2012

(30) Foreign Application Priority Data

Sep. 28, 2010  (KR) .................. 10-2010-0093973

(51) Int. Cl.
*F01N 3/02* (2006.01)

(52) U.S. Cl.
USPC ............... 60/309; 181/221; 181/227; 60/320

(58) Field of Classification Search
USPC .......................... 60/301, 309; 181/227, 228
See application file for complete search history.

(56) References Cited

U.S. PATENT DOCUMENTS

| | | | | |
|---|---|---|---|---|
| 4,589,852 A | * | 5/1986 | Price | ............ 440/89 R |
| 5,161,371 A | * | 11/1992 | Deville | ................ 60/309 |
| 5,174,113 A | * | 12/1992 | Deville | ................ 60/309 |
| 6,595,318 B2 | * | 7/2003 | Ebinger et al. | ........... 181/227 |
| 6,768,082 B2 | * | 7/2004 | Aoyama et al. | ...... 219/125.11 |
| 7,065,961 B1 | * | 6/2006 | Batten, Jr. | ................ 60/309 |
| 7,464,464 B2 | * | 12/2008 | Neef | .............. 29/890.08 |
| 7,587,894 B2 | * | 9/2009 | Kang et al. | ................ 60/309 |
| 7,713,493 B2 | * | 5/2010 | Bosanec et al. | ........... 422/180 |
| 2004/0206573 A1 | * | 10/2004 | Hsu | ........................ 181/228 |

FOREIGN PATENT DOCUMENTS

| | | |
|---|---|---|
| JP | 61-78224 U | 5/1986 |
| JP | 10-2000-0015297 A | 3/2000 |
| JP | 2005-009400 A | 1/2005 |
| JP | 2008-106630 A | 5/2008 |
| JP | 2008-115798 A | 5/2008 |
| KR | 1998-039891 A | 8/1998 |

* cited by examiner

*Primary Examiner* — Jesse Bogue
(74) *Attorney, Agent, or Firm* — Morgan, Lewis & Bockius LLP

(57) ABSTRACT

A tail trim assembly for an exhaust pipe in a vehicle which may be mounted at a rear portion of the exhaust pipe that may be formed at an end of a vehicle muffler and discharges exhaust gas and condensed water from the muffler to the outside, may include a main body fitted around the rear portion of the exhaust pipe, at least a welding part formed at an end of the main body and welded to the exhaust pipe, and a collecting part formed at a rear end of the main body, wherein the rear end of the main body and a rear end of the rear portion in the exhaust pipe may be spaced with a predetermined gap to collect the condensed water discharged from the exhaust pipe therethrough.

5 Claims, 4 Drawing Sheets

US 8,733,086 B2

TAIL TRIM ASSEMBLY FOR EXHAUST PIPE IN VEHICLE

CROSS-REFERENCE TO RELATED APPLICATION

The present application claims priority to Korean Patent Application No. 10-2010-0093973 filed in the Korean Intellectual Property Office on Sep. 28, 2010, the entire contents of which is incorporated herein for all purposes by this reference.

BACKGROUND OF THE INVENTION

1. Field of the Invention

The present invention relates to a tail trim assembly for the exhaust pipe in a vehicle. More particularly, the present invention relates to a tail trim assembly for the exhaust pipe in a vehicle which retards or prevents leakage by collecting condensed water that is discharged through the exhaust pipe formed at the end of the muffler of the vehicle while improve commercial value by improving the aesthetic appearance of the exhaust pipe.

2. Description of Related Art

In general, for example, the mufflers used in the exhaust systems of vehicles reduce exhaust noise by decreasing temperature and pressure of the exhaust gas discharged from the engine.

The mufflers are predetermined-shaped cylindrical members of which the inside is divided in several spaces to reduce noise by decreasing pressure change, interference of the sound wave of exhaust gas passing through the barriers, and exhaust temperature.

Accordingly, condensed water is produced by condensation of high-temperature exhaust gas in the mufflers, such that an exhaust pipe is mounted at the rear end of the mufflers to face the ground to discharge the condensed water as fast as possible.

Meanwhile, vehicles equipped with a GDI (Gasoline Direct Injection) engine are recently increased and excessive soot is produced by the exhaust gas in the vehicles equipped with the GDI engine.

The soot in the exhaust gas is mixed with the condensed water in the muffler and makes the condensed water black.

However, the exhaust pipe designed to be installed to face down in the related art quickly discharges the black condensed water mixed with soot to the ground in idling of the vehicles equipped with the GDI engine, such that the ground where the vehicles stop is contaminated, which pollutes the environment.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a tail trim assembly for the exhaust pipe in a vehicle having advantages of retarding or preventing leakage by collecting condensed water that is discharged through the exhaust pipe formed at the end of the muffler of the vehicle in the idling of the vehicle while improve commercial value by improving the aesthetic appearance of the exhaust pipe.

In an aspect of the present invention, the tail trim assembly for an exhaust pipe in a vehicle which may be mounted at a rear portion of the exhaust pipe that may be formed at an end of a vehicle muffler and discharges exhaust gas and condensed water from the muffler to the outside, may include a main body fitted around the rear portion of the exhaust pipe, at least a welding part formed at an end of the main body and welded to the exhaust pipe, and a collecting part formed at a rear end of the main body, wherein the rear end of the main body and a rear end of the rear portion in the exhaust pipe may be spaced with a predetermined gap to collect the condensed water discharged from the exhaust pipe therethrough.

The exhaust pipe and the main body may be declined with a predetermined angle from a horizontal direction.

The main body may be formed in a cylindrical shape and of which the rear end may be rounded toward the inside of the main body to form the predetermined gap with a rear end of the exhaust pipe.

The main body may be asymmetrically formed such that the thickness (D1) of a lower portion thereof where the collecting part is formed may be larger than the thickness (D2) of an upper portion thereof (D1>D2).

The at least a welding part protrudes toward an outer circumference of the exhaust pipe, along the external circumferential surface of the main body, wherein the at least a welding part include upper welding portions formed at both upper sides at a front end of the main body and a lower welding portion formed at the rear end of the main body, and the upper welding portions and the lower welding portion may be spaced at a predetermined angle from each other along a circumferential direction of the main body.

The predetermined angle may be approximately 120°.

The collecting part may be spaced apart from the bottom of a rear end of the exhaust pipe and bends toward the external circumferential surface of the main body from the lower welding portion, such that a storage space where the condensed water collects may be defined.

According to the exemplary embodiment of the present invention, it is possible to retard or prevent leakage by collecting condensed water that is discharged through the exhaust pipe formed at the end of the muffler of the vehicle in the idling of the vehicle while improve commercial value by improving the aesthetic appearance of the exhaust pipe.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
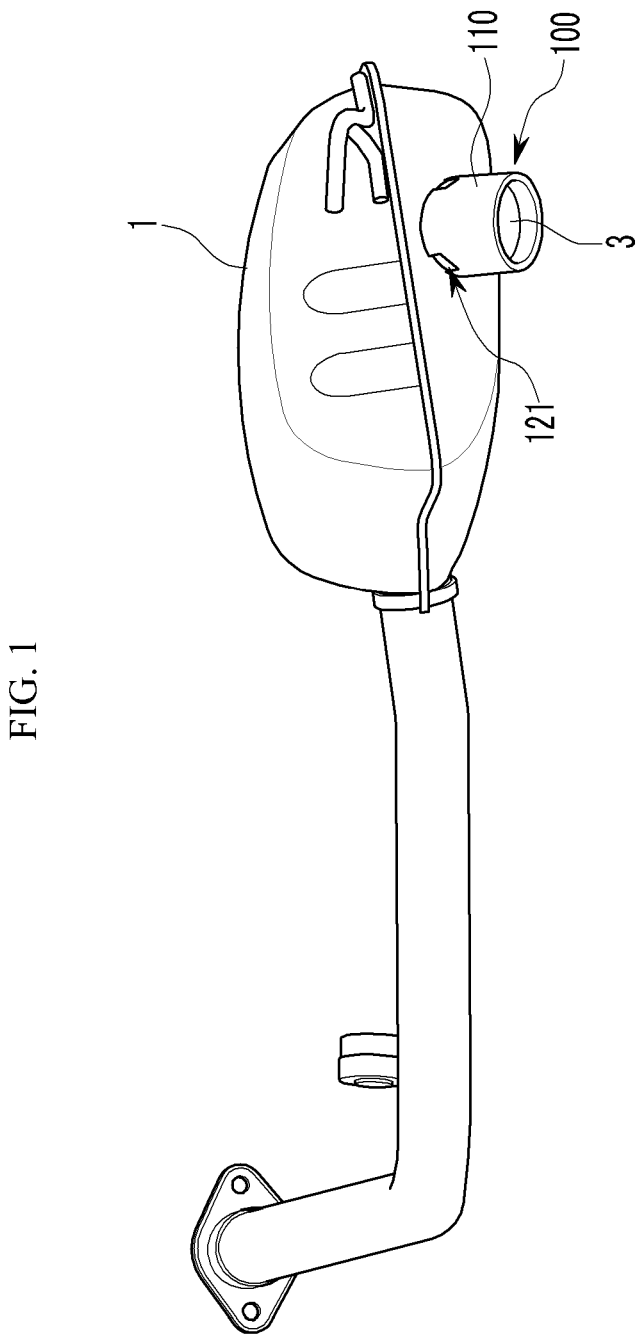
FIG. 1 is a perspective view of a muffler equipped with a tail trim assembly for the exhaust pipe in a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
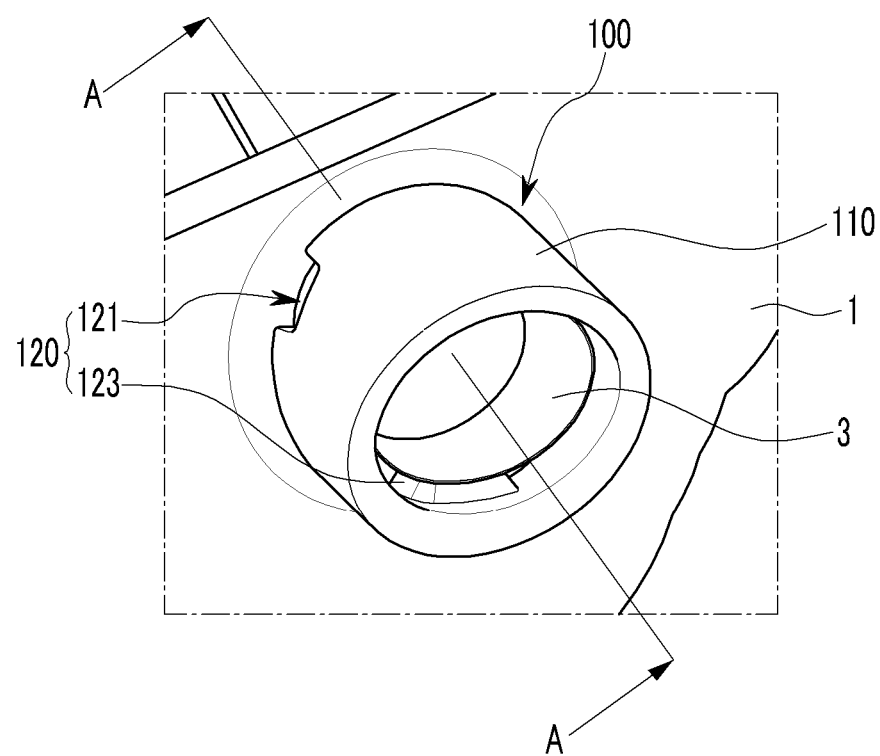
FIG. 2 is a perspective view of a tail trim assembly for the exhaust pipe in a vehicle according to an exemplary embodiment of the present invention.
Figure 3:
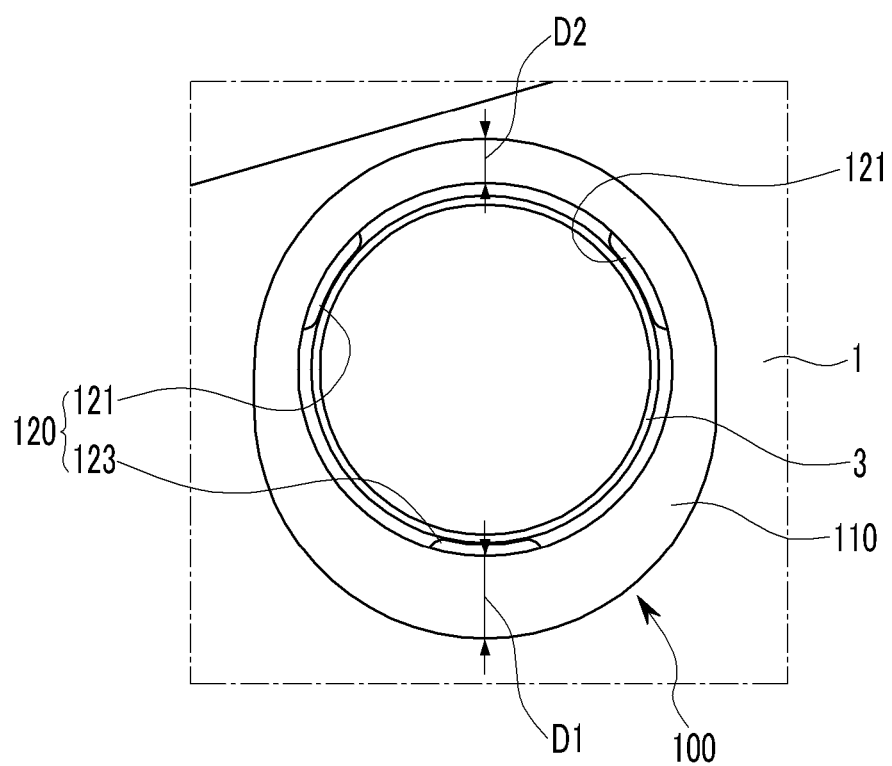
FIG. 3 is a front view of the tail trim assembly for the exhaust pipe in a vehicle according to an exemplary embodiment of the present invention.
Figure 4:
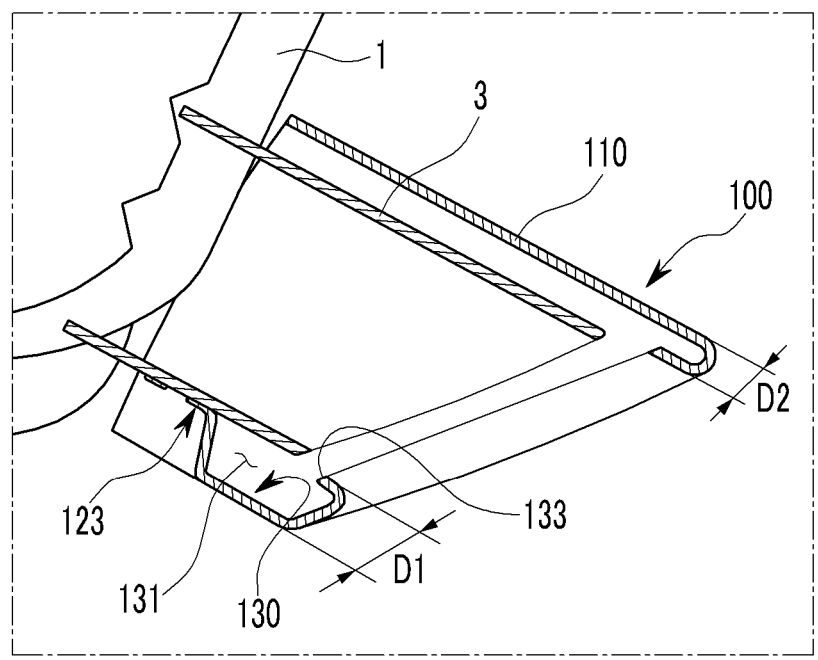
FIG. 4 is a cross-sectional view taken along line A-A of FIG. 2.

FIG. 1 is a perspective view of a muffler equipped with a tail trim assembly for the exhaust pipe in a vehicle according to an exemplary embodiment of the present invention, FIG. 2 is a perspective view of a tail trim assembly for the exhaust pipe in a vehicle according to an exemplary embodiment of the present invention, FIG. 3 is a cross-sectional view taken along line A-A of FIG. 2, and FIG. 4 is a front view of the tail trim assembly for the exhaust pipe in a vehicle according to an exemplary embodiment of the present invention.

Referring to the drawings, a tail trim assembly 100 for the exhaust pipe in a vehicle according to the exemplary embodiment of the present invention increases commercial value by improving the aesthetic appearance of an exhaust pipe 3 mounted at the end of a vehicle muffler 1, and retards and prevents leakage by collecting condensed water discharged through the exhaust pipe 3 in idling of the vehicle.

For this purpose, the tail trim assembly 100 for the exhaust pipe in a vehicle according to the exemplary embodiment of the present invention, as shown in FIG. 1, is mounted on the exhaust pipe 3 that is mounted at the end of the vehicle muffler 1 to face down and discharges exhaust gas and condensed water from the muffler 1 to the outside.

The tail trim assembly 100, as shown in FIGS. 1 and 2, includes a main body 110, a welding part 120, and a collecting part 130, which are described in detail below.

First, the main body 110 has one end fitted on the rear end of the exhaust pipe 3.

The main body 110 is formed in a cylindrical shape, and preferably, the rear end rounded toward the inside of the main body 110.

Further, the main body 110 may be asymmetrically formed such that the thickness D1 of the lower portion where the collecting part 130 is formed is larger than the thickness D2 of the upper portion (D1>D2).

In the exemplary embodiment, at least one or more of the welding parts 120 are formed at one end of the main body 110 which is fitted on the exhaust pipe 3, and welded to the exhaust pipe 3.

In this configuration, the welding parts 120, as shown in FIG. 3, each may protrude toward the interior circumference of the main body 110, along the external circumferential surface of the main body 110.

Further, the welding parts 120 each include an upper welding portion 121 formed at both upper sides from the center of the main body 110 and a lower welding portion 123 formed at the lower center, in which the upper welding portions 121 and the lower welding portion 123 are spaced at a predetermined angle from each other.

In this configuration, the predetermined angle may be 120°.

Therefore, in the exemplary embodiment, the upper welding portions 121 are spaced at 120° from each other at both upper sides of the main body 110 and the lower welding portion 123 is formed at the lower center of the main body 110, between the upper welding portions 121, and welded to the exhaust pipe 3.

Meanwhile, although the exemplary embodiment exemplifies when the upper and lower welding portions 121 and 123 are formed at three positions spaced at 120° from the center of the main body 110, the present invention is not limited thereto, and the position, number, and angle of the upper and lower welding portions may be changed.

Further, the collecting part 130, as shown in FIG. 4, is formed at the rear end of the main body 110 to collect condensed water discharged through the exhaust pipe 3 from the muffler 1.

The collecting part 130 is spaced apart from the bottom of the end of the exhaust pipe 3 and bends toward the external circumferential surface of the main body 110 from the lower welding portion 123, such that a storage space 131 where the condensed water collects is defined, including a gap 133 formed between the collecting part 130 and the exhaust pipe 3.

That is, the collecting portion 130 is formed in the main body 110, corresponding to the lower portion of the end of the exhaust pipe 3 to collect and store the dark condensed water mixed with soot discharged through the exhaust pipe 3 in idling of the vehicle.

Therefore, the collecting part 130 retards or prevents the condensed water that is produced in the muffler and discharged to the ground through the exhaust pipe 3, when the vehicle is in stop, such that it is possible to prevent the condensed water from contaminating the ground.

Therefore, it is possible to increase the commercial value by improving the aesthetic appearance of the exhaust pipe 3 formed at the end of the vehicle muffler 1, and retard or prevent leakage by collecting the condensed water discharged through the exhaust pipe 3, when the vehicle is in stop at the idling stage, by using the tail trim assembly 100 for the exhaust pipe in a vehicle having the configuration described above, according to the exemplary embodiment of the present invention.

Therefore, it is possible to basically prevent environment contamination because the tail trim assembly 100 does not contaminate the ground.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tail trim assembly for a vehicle exhaust pipe that discharges exhaust gas and condensed water from a vehicle muffler, the tail trim assembly comprising:
    an exhaust pipe extending from the rear of a vehicle muffler;
    a main body radially spaced from and encircling a rear portion of the exhaust pipe, a rear end of the main body axially spaced from a terminal end of the exhaust pipe forming a predetermined gap between the terminal end of the exhaust pipe and the rear end of the main body;
    at least a welding part formed at a front end of the main body and welded to the exhaust pipe; and
    a collecting part formed adjacent the rear end of the main body to collect the condensed water discharged from the exhaust pipe passing through the predetermined gap;
    wherein the at least a welding part protrudes toward an outer circumference of the exhaust pipe, from an external circumference of the main body;
    wherein the at least a welding part include upper welding portions formed at opposing upper sides of the front end of the main body and a lower welding portion formed adjacent the collecting part of the main body; and
    wherein the collecting part extends from the external circumference of the main body toward the lower welding portion to define a storage space collecting the condensed water that has passed through the predetermined gap.

2. The tail trim assembly of claim 1, wherein the exhaust pipe and the main body are declined with a predetermined angle from a horizontal direction.

3. The tail trim assembly of claim 1, wherein the main body is formed in a cylindrical shape and of which the rear end portion is rounded toward the inside of the main body to form the predetermined gap with the rear end of the exhaust pipe.

4. The tail trim assembly of claim 1, wherein the main body is asymmetrically formed such that the height (D1) of a portion thereof where the collecting part is formed is larger than the height (D2) of a remaining portion thereof (D1>D2).

5. The tail trim assembly of claim 1, wherein the predetermined angle is 120°.

* * * * *